(12) United States Patent
Sutar et al.

(10) Patent No.: US 11,933,419 B2
(45) Date of Patent: Mar. 19, 2024

(54) LOW POWER HYDRAULIC VALVES WITH INCREASED RATE-OF-FLOW

(71) Applicant: Danfoss Power Solutions II Technology A/S, Nordborg (DK)

(72) Inventors: Nilesh Anant Sutar, Pune Maharastra (IN); Varun Tyagi, Uttar Pradesh (IN)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 17/640,453

(22) PCT Filed: Aug. 31, 2020

(86) PCT No.: PCT/EP2020/025392
§ 371 (c)(1),
(2) Date: Mar. 4, 2022

(87) PCT Pub. No.: WO2021/043440
PCT Pub. Date: Mar. 11, 2021

(65) Prior Publication Data
US 2022/0325819 A1    Oct. 13, 2022

Related U.S. Application Data

(60) Provisional application No. 62/896,932, filed on Sep. 6, 2019.

(51) Int. Cl.
*F16K 31/40*    (2006.01)
(52) U.S. Cl.
CPC .................... *F16K 31/406* (2013.01)

(58) Field of Classification Search
CPC ...................... F16K 31/406; F16K 31/408
See application file for complete search history.

(56) References Cited

U.S. PATENT DOCUMENTS

| | | | | |
|---|---|---|---|---|
| 1,055,161 | A * | 3/1913 | Geisseinger | E03C 1/108 251/34 |
| 2,339,352 | A * | 1/1944 | Ray | F16K 31/406 251/30.02 |
| 2,470,470 | A * | 5/1949 | Carbon | F16K 31/406 251/266 |
| 2,665,708 | A * | 1/1954 | Ghormley | F16K 31/406 137/493 |

(Continued)

FOREIGN PATENT DOCUMENTS

| | | |
|---|---|---|
| CN | 101490456 A | 7/2009 |
| CN | 104870874 A | 8/2015 |

(Continued)

OTHER PUBLICATIONS

International Search Report for PCT/EP2020/025392 dated Nov. 9, 2020.

*Primary Examiner* — Umashankar Venkatesan
(74) *Attorney, Agent, or Firm* — McCormick, Paulding & Huber PLLC

(57) ABSTRACT

The present disclosure relates to a hydraulic valve that has a two-stage con-struction that provides for higher fluid flow and lower power consumption. The present disclosure also relates to a hydraulic valve that may be constructed to include a pilot-poppet, a pilot-poppet valve seat, and a main-poppet. The main-poppet may be mechanically isolated from the pilot-poppet by the pilot-poppet valve seat.

15 Claims, 8 Drawing Sheets

(56) References Cited

U.S. PATENT DOCUMENTS

| | | | | |
|---|---|---|---|---|
| 2,891,760 | A * | 6/1959 | Dewar | F16K 31/406 251/44 |
| 3,218,022 | A * | 11/1965 | Lewis | F16K 31/408 251/30.03 |
| 3,405,906 | A | 10/1968 | Keller | |
| 3,424,427 | A * | 1/1969 | Erich | F16K 31/406 277/467 |
| 4,304,264 | A | 12/1981 | McClintock et al. | |
| 4,799,645 | A * | 1/1989 | Kramer | F16K 31/406 251/38 |
| 4,848,721 | A | 7/1989 | Chudakov | |
| 5,072,752 | A * | 12/1991 | Kolchinsky | F16K 31/406 137/493 |
| 8,870,152 | B2 * | 10/2014 | Nagata | F16K 31/408 251/30.04 |
| 10,066,758 | B2 * | 9/2018 | Marcantonio | F16K 31/406 |
| 10,527,069 | B1 * | 1/2020 | Borja | F16K 31/408 |
| 10,767,787 | B2 * | 9/2020 | Morita | F16K 31/406 |
| 10,794,512 | B2 * | 10/2020 | Morita | G05D 7/0635 |
| 2010/0175764 | A1 * | 7/2010 | Cecchin | F04F 5/20 91/446 |
| 2014/0264101 | A1 * | 9/2014 | Perotto | F01P 3/06 251/28 |

FOREIGN PATENT DOCUMENTS

| | | |
|---|---|---|
| CN | 107750315 A | 3/2018 |
| DE | 3045360 A1 | 7/1982 |
| DE | 102013210458 A1 | 8/2014 |
| EP | 0503188 A2 | 9/1992 |
| EP | 2902682 A1 | 8/2015 |
| JP | 2016118222 A | 6/2016 |
| RU | 192042 U1 | 9/2019 |

* cited by examiner

LOW POWER HYDRAULIC VALVES WITH INCREASED RATE-OF-FLOW

CROSS-REFERENCE TO RELATED APPLICATION

This application is a National Stage application of International Patent Application No. PCT/EP2020/025392, filed on Aug. 31, 2020, which claims priority to U.S. Application No. 62/896,932 filed on Sep. 6, 2019, each of which is hereby incorporated by reference in its entirety.

TECHNICAL FIELD

The present disclosure relates generally to hydraulic valves which have improved flow characteristics. More specifically, the present disclosure relates to a solenoid valve structure with operating characteristics that increase flow capacity using reduced power consumption at a low pressure drop.

BACKGROUND

Solenoids are widely used to convert electrical energy into mechanical movement and, due to their utility, are used in a wide range of applications, such as to drive mechanical components integrated as part of off-road equipment.

Examples of off-road equipment may include construction equipment and agricultural equipment.

There is a need to reduce power consumption in existing hydraulic valves while providing a larger volume of internal flow.

SUMMARY

Aspects of the present disclosure relate to a hydraulic valve. The hydraulic valve may be configured to provide higher flow rates and lower power consumption.

The hydraulic valve may include a pilot-poppet, a pilot-poppet valve seat, and a main-poppet. The main-poppet may be mechanically isolated from the pilot-poppet by the pilot-poppet valve seat.

The hydraulic valve may include vertical and inclined drill holes for improved pilot flow. The aid of fluid pressure may also help to lift the pilot-poppet and thereby reduce power consumption. This architecture is advantageous in situations where it is desirable to keep power consumption low and flow volume high.

Another aspect of the present disclosure relates to a hydraulic valve. The hydraulic valve may include an outer valve housing piece that includes an exterior threaded portion for securing the valve within a valve manifold.

The hydraulic valve may include a solenoid assembly that includes a solenoid coil contained within a solenoid housing. The hydraulic valve may include a valve cage coupled to the outer valve housing piece. The valve cage may include an axial port positioned along an axis that extends through the solenoid coil. The valve cage may also define a side port.

The hydraulic valve may include a pilot-poppet valve seat positioned within the outer valve housing piece. The pilot-poppet valve seat and the valve cage may be mechanically secured relative to each other such that relative movement between the pilot-poppet valve seat and the valve cage along the axis is prevented. The pilot-poppet valve seat may define a pilot port and the pilot-poppet valve seat may define first and second opposite sides.

The hydraulic valve may also include a pilot-poppet positioned at the second side of the pilot-poppet valve seat. The pilot-poppet may be movable relative to the pilot-poppet valve seat along the axis between a first position and a second position.

The pilot-poppet may close the pilot port when in the first position, and the pilot port may be open when the pilot-poppet is in the second position.

The hydraulic valve may include a pilot-poppet spring that biases the pilot-poppet in a first axial direction toward the first position. The pilot-poppet is driven in second axial direction toward the second position when the solenoid coil is energized.

The hydraulic valve may include a main-poppet positioned at the first side of the pilot-poppet valve seat. The main-poppet may be mechanically isolated from the pilot-poppet by the pilot-poppet valve seat. The main-poppet may be positioned within the valve cage and may be movable along the axis between a closed position and an open position. When the main-poppet is in the closed position, the main-poppet may engage a main valve seat defined by the valve cage to prevent direct fluid communication between the axial port and the side port. When the main-poppet is in the open position, the main-poppet is displaced from the main valve seat to allow direct fluid communication between the axial port and the side port.

The hydraulic valve may further include a main-poppet spring captured between the pilot-poppet valve seat and the main-poppet for biasing the main-poppet toward the closed position and a main-poppet chamber defined between the main-poppet and the pilot-poppet valve seat. The main-poppet may include a chamber pressurization orifice that provides fluid communication between the side port and the main poppet chamber.

When the pilot-poppet is in the first position and the pressure is higher at the side port than the axis port, the main poppet chamber is pressurized from the side port through the chamber pressurization orifice such that spring force from the main-poppet spring combined with pressure within the main-poppet chamber cooperate to hold the main-poppet chamber in the closed position.

When the pilot-poppet is in the second position and the pressure is higher
at the side port than the axial port, the pilot port provides fluid communication between the main-poppet chamber and a passage that extends to the axial port such that pressure within the main-poppet chamber is relieved through the passage thereby allowing pressure from the side port acting on an exterior of the main-poppet to move the main-poppet from the closed position to the open position against the bias of the main-poppet spring.

In certain examples, the pilot port is open when the pilot-poppet is in the first position, and the pilot-poppet closes the pilot port when in the second position.

When the pilot-poppet is in the first position and the pressure is higher at the side port than the axial port, the pilot-poppet is in the open position such that the main poppet chamber is not pressurized and flow may pass through the main-poppet to the axial port.

In certain examples, when the pilot-poppet is in the second position and the pressure is higher at the side port than the axial port, the pilot-poppet may be moved to the second position in which the pilot-poppet is in the closed position. As such, the main-poppet may pressurize to hold the main-poppet in a closed position such that fluid communication from the side port to the axial port is blocked.

A variety of additional aspects will be set forth in the description that follows. The aspects relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Figure 1:
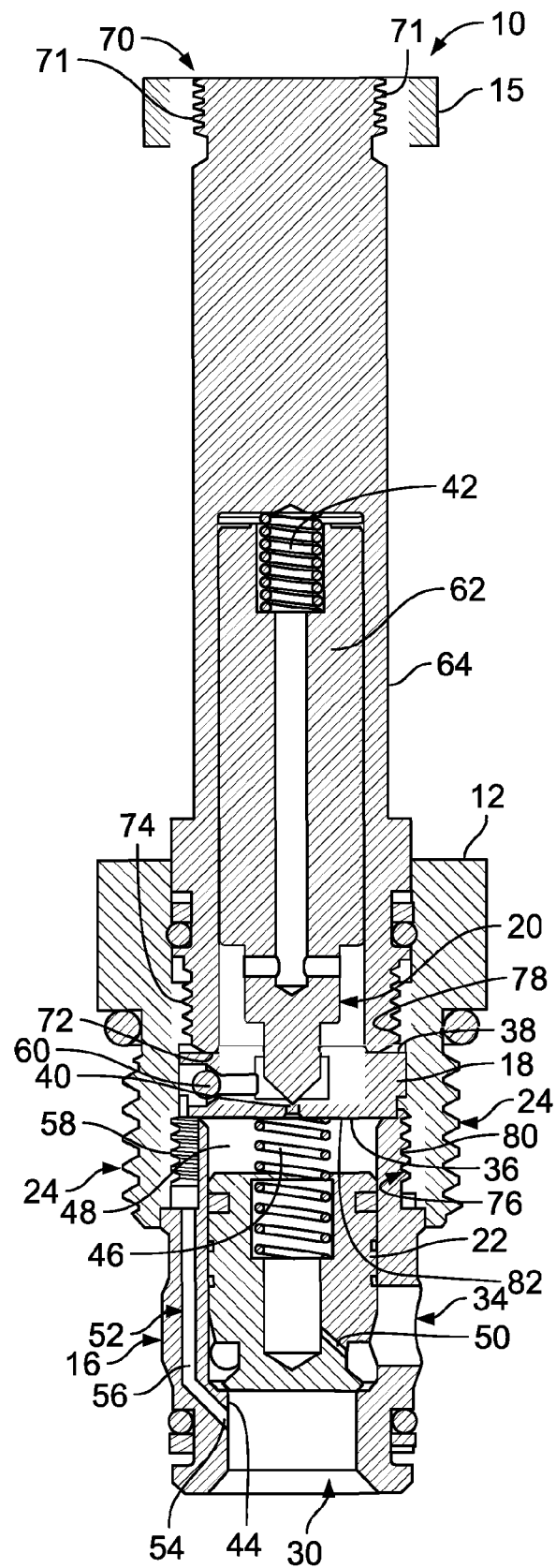
FIG. 1 is a cross-sectional view showing an example configuration of a hydraulic valve in accordance with principles of the present disclosure in a closed state.
Figure 2:
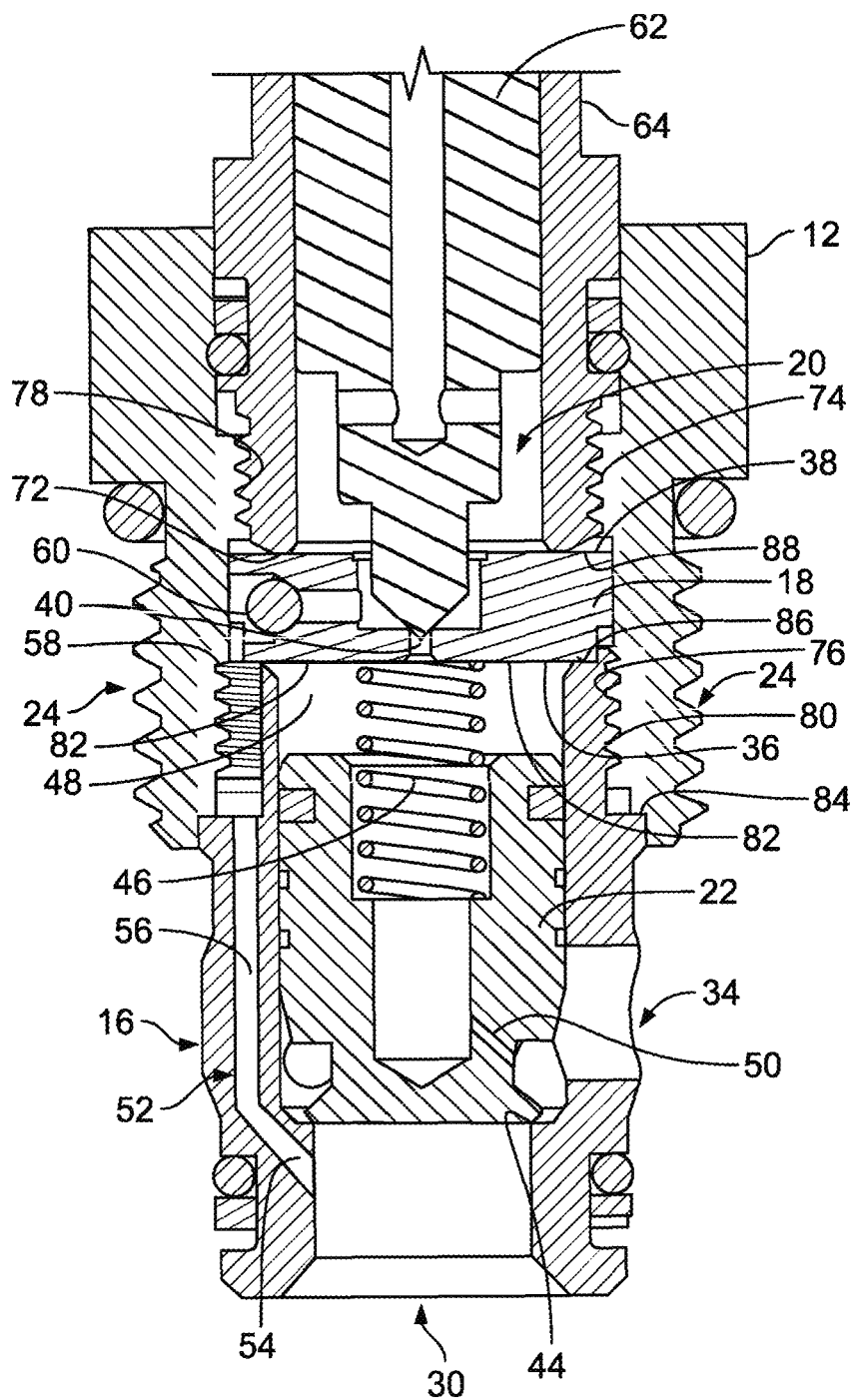
FIG. 2 is an enlarged portion of the hydraulic valve of FIG. 1.

FIGS. 1 and 2 are a cross-sectional views of an example configuration of a hydraulic valve 10 in accordance with the principles of the present disclosure in a normally closed state.

In one example, the hydraulic valve 10 may include an outer valve housing piece 12, a solenoid assembly 14, a valve cage 16, a pilot-poppet valve seat 18, a pilot-poppet 20, and a main-poppet 22.

In this example, the outer valve housing 12 includes an exterior threaded portion 24 for securing the hydraulic valve 10 within a valve manifold (not shown). The solenoid assembly 14 includes a solenoid coil 26 that is contained within a solenoid housing 28.

The valve cage 16 may be coupled to the outer valve housing piece 12. The valve cage 16 may include an axial port 30 (e.g., first port) positioned along an axis 32 that extends through the solenoid coil 26. The valve cage 16 may also define a side port 34 (e.g., second port).

The pilot-poppet valve seat 18 may be positioned within the outer valve housing piece 12. The pilot-poppet valve seat 18 may define a first side 36, an opposite, second side 38 and a pilot port 40. The pilot-poppet valve seat 18 and the valve cage 16 may be mechanically secured relative to each other such that relative movement between the pilot-poppet valve seat 18 and the valve cage 16 along the axis 32 is prevented. The pilot-poppet 20 may be positioned at the second side 38 of the pilot-poppet valve seat 18.

The pilot-poppet 20 may be movable relative to the pilot-poppet valve seat 18 along the axis 32 between a first position and a second position. That is, the pilot-poppet 20 is arranged and configured to close the pilot port 40 when in the first position. When the pilot-poppet 20 is in the second position, the pilot port 40 is open. A pilot-poppet spring 42 may be adapted to bias the pilot-poppet 20 in a first axial direction toward the first position. When the solenoid coil is energized, the pilot-poppet 20 may be driven in a second axial direction toward the second position. In certain examples, a pilot pressure force can act on the pilot-poppet 20 in a direction of the solenoid force to assist in opening the pilot port 40 to thereby reduce the solenoid force required and the solenoid input power. In certain examples, the power consumption may be less than 15 watts in such a construction although alternatives are possible.

The main-poppet 22 may be positioned at the first side 36 of the pilot-poppet valve seat 18. The main-poppet 22 may be mechanically isolated from the pilot-poppet 20 by the pilot-poppet valve seat 18. Such architecture provides a two stage construction, in which the lift of the main-poppet 22 is independent of the lift of the pilot-poppet 20. That is, the distance the main-poppet 22 may move is not dependent on the pilot-poppet 20. This configuration is advantageous in that it allows increased lift of the main-poppet 22 which provides more flow to pass at rated pressure drop. In certain examples, the construction may allow for an increased flow rate that may be at least 1.5 times higher for a given pressure drop compared to conventional solenoid valves that can pass about 12 GPM flow at 100 psi pressure drop. In certain examples, more than a 50% increase in the flow rate can be achieved with the construction. In certain examples, the flow rate from the axial port 30 to the side port 34 can be 20 GPM at 100 psi pressure drop. In certain examples, the flow rate from the side port 34 to the axial port 30 can be about 21 GPM at 100 psi pressure drop.

Until the pilot-poppet 20 is closed, the pressure at the top of the main-poppet 22 may be equal to the pressure from the side port 34. The main-poppet 22 may be positioned within the valve cage 16 and may be movable along the axis 32 between a closed position and an open position. When the main-poppet 22 is in the closed position, the main-poppet 22 may engage a main valve seat 44 defined by the valve cage 16 to prevent direct fluid communication between the axial port 30 and the side port 34. When the main-poppet 22 is in the open positon, the main-poppet 22 is displaced from the main valve seat 44 to allow direct fluid communication between the axial port 30 and the side port 34.

A main-poppet spring 46 may be captured between the pilot-poppet valve seat 18 and the main-poppet 22 for biasing the main-poppet 22 toward the closed position.

A main-poppet chamber 48 may be defined between the main-poppet 22 and the pilot-poppet valve seat 18. The main-poppet 22 may include a chamber pressurization orifice 50 that provides fluid communication between the side port 34 and the main poppet chamber 48.

When the pilot-poppet 20 is in the first position and the pressure is higher at the side port 34 than the axial port 30, the main poppet chamber 48 may be pressurized from the side port 34 through the chamber pressurization orifice 50 such that spring force from the main-poppet spring 46 combined with pressure within the main-poppet chamber 48 cooperate to hold the main-poppet 22 in the closed position when the solenoid is not energized.

When the solenoid coil 26 is energized while the pressure is higher at the side port 34 than the axial port 30, the pilot port 40 opens and the main poppet chamber 48 depressurizes. With the main poppet chamber 48 depressurized, pilot pressure from the side port 34 acts on the exterior of the main-poppet 22 to move the main poppet 22 to the open position such that flow is permitted directly from the side port 34 to the axial port 34 through the main valve seat 44.

The location and angle of the chamber pressurization orifice 50 is adapted to prevent the main poppet chamber 48 from being pressurized when the pilot port 40 is closed, the main poppet 22 is open, and flow is proceeding from the axial port 30 to the side port 34 through the main valve seat 44. In certain examples, the main-poppet 22 may define an annular ring or cut passage 13 at the chamber pressurization orifice 50 that has a carved, notched shape that allows flow to pass through and across the main-poppet 22. The shape of the annular ring cut passage 13 is important because it is constructed such that when the main-poppet 22 opens due to flow pressure from the axial port 30 to the side port 34, the annular ring cut passage 13 is positioned and angled in such a way that the flow does not go through the chamber pressurization orifice 50 to pressurize the top side of the main-poppet 22 which can push the main-poppet 22 shut.

The annular ring cut passage 13 allows the main-poppet 22 to remain open when there is open flow from the axial port 30 to the side port 34 because the shape of the passage 13 creates a low pressure area at the mouth of the chamber pressurization orifice 50 such that no pressurization occurs at the top side of the main-poppet 22. That is, when the main-poppet 22 is in the open position, the low pressure region adjacent the chamber pressurization orifice 50 prevents flow through the chamber pressurization orifice 50 that would pressurize the main poppet chamber 48 and close the main-poppet 22.

When the pilot-poppet 20 is in the second position and the pressure is higher at the side port 34 than the axial port 30, the pilot port 40 may provide fluid communication between the main-poppet chamber 48 and a passage 52. The passage 52 may extend to the axial port 30 such that pressure within the main-poppet chamber 48 is relieved through the passage 52 thereby allowing pressure from the side port 34 acting on an exterior of the main-poppet 22 to move the main-poppet 22 from the closed position to the open position against the bias of the main-poppet spring 46.

The passage 52 may include at least a portion drilled through the valve cage 16. The portion of the passage 52 drilled through the valve cage 16 may include a first section 54 and a second section 56. The first section 54 may extend at an oblique angle relative to the axis 32 from the axial port 30 to the second section 56. The second section 56 may extend parallel to the axis 32 from adjacent the pilot-poppet valve seat 18 to the first section 54. The second section 56 may extend through exterior threads 58 defined by the valve cage 16.

The passage 52 may also include a one-way check valve 60 that allows fluid flow in a first direction from the pilot port 40 toward the axial port 30 and prevents fluid flow in a second direction from the axial port 30 toward the pilot port 40.

When the pressure at the axial port 30 is higher than the pressure at the side port 34 and is sufficiently high to overcome the main-poppet spring 46, the main-poppet 22 may be forced by the pressure acting on the main-poppet 22 from the closed position to the open position in which flow is permitted through the main valve seat 44 from the axial port 30 to the side port 34.

In certain examples, the pilot-poppet 20 may be integrated within a magnetic core 62. The magnetic core 62 may be arranged and configured to be driven in the second direction along the axis 32 when the solenoid coil 26 is energized by electrical current flowing through the solenoid coil 26. Energizing the solenoid coil 26 causes the pilot-poppet 20 to lift off the pilot port 40.

The hydraulic valve 10 may further include a core tube 64 that may be configured to extend through the solenoid coil 26 along the axis 32. The magnetic core 62 may be configured to move along the axis 32 within the core tube 64. In certain examples, the core tube 64 may include at least portions that are non-magnetic.

The pilot-poppet 20 may be arranged and configured to provide a pressure relief function when the pressure at the side port 34 exceeds a predetermined level. The predetermined level may be dependent upon a spring force applied to the pilot-poppet 20 by the pilot-poppet spring 42 and an area of the pilot-poppet 20 exposed through the pilot port 40 to pressure within the main-poppet chamber 48.

When main-poppet 22 is in the closed position and the pressure in the main-poppet chamber 48 is pressurized to the predetermined level by pressure from the side port 34, the pressure within the main-poppet chamber 48 forces the pilot-poppet 20 in the second direction to open the pilot port 40 and relieve pressure from the main-poppet chamber 48 through the passage 52 to the axial port 30. When the pressure in the main-poppet chamber 48 is relieved, the pressure from the side port 34 acting on the exterior of the main-poppet 22 moves the main-poppet 22 from the closed position to the open position against the bias of the main-poppet spring 46 such that pressure at the side port 34 is relieved to the axial port 30.

In certain examples, the solenoid housing 28 may include a first end 66 and an opposite second end 68. The solenoid housing 28 may be axially compressed between the outer valve housing piece 12 at the second end 68 and a nut 15 at the first end 66. The nut 15 is threaded on a top end of the core tube 64. The outer valve housing piece 12 is threaded on a bottom end of the core tube 64. The core tube 64 may be configured to extend between the first and second ends 66, 68. The core tube 64 may include a first end 70 and an opposite second end 72. In certain examples, the first end 70 of the core tube 64 may be arranged and configured to extend beyond the first end 66 of the solenoid housing 28 and can include external threads 71. The second end 72 of the core tube 64 may define external core tube threads 74.

In certain examples, the nut 15 may be threaded on the threads 71 of the core tube 64 at the first end 66 of the solenoid housing 28. The outer valve housing piece 12 may include a first set of internal threads 76 and a second set of internal threads 78. The second set of internal threads 78 may be adapted to engage the external core tube threads 74 of the core tube 64 to secure the outer valve housing piece 12 adjacent the solenoid housing 28. By threading the nut 15 on the threads 71 and the outer valve housing piece 12 on the threads 74, the solenoid housing 28 can be clamped on the core tube 64 by being axially compressed between the nut 15 and the outer valve housing piece 12.

In certain examples, the valve cage 16 may define external cage threads 80 that may engage the first set of internal threads 76 of the outer valve housing piece 12 to secure the valve cage 16 within the outer valve housing piece 12. The pilot-poppet valve seat 18 may be clamped between an end 82 of the valve cage 16 and the second end 72 of the core tube 64.

Still referring to FIG. 2, a first annular seal 84 may be defined by annular axial contact between the outer valve housing piece 12 and the valve cage 16. A second annular seal 86 may be defined by annular axial contact between the end 82 of the valve cage 16 and the first side 36 of the pilot-poppet valve seat 18. A third annular seal 88 may be defined by annular axial contact between the second side 38 of the pilot-poppet valve seat 18 and the second end 72 of the core tube 64. The first set of internal threads 76 of the outer valve housing piece 12 and the external cage threads 80 of the valve cage 16 are threaded together (e.g., torqued) until the first annular seal 84 is created. The second set of internal threads 78 of the outer valve housing piece 12 and the external core tube threads 74 of the core tube 64 are to provide the second and third annual seals 86, 88 after tightening of the joint between threads 76 and 80. Thereafter, nut 15 is tightened to clamp the solenoid housing 28 in place on the core tube 64. The core tube 64 can be utilized with multiple size valves by changing the outer valve housing piece 12 size to match different size requirements.

Figure 4:
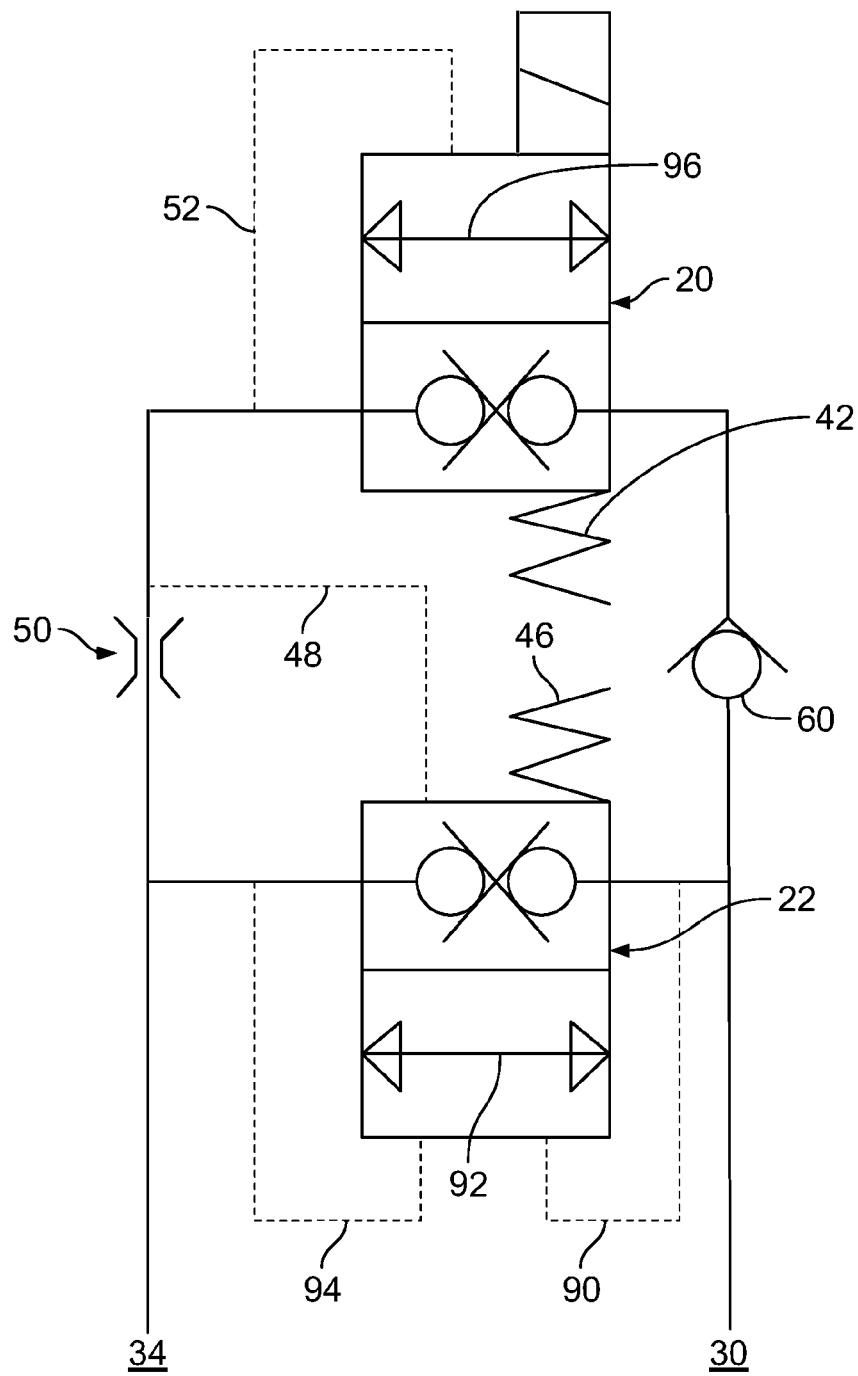
FIG. 4 is a schematic symbol illustration of the hydraulic valve of FIG. 1.

FIG. 4 is a schematic symbol illustration of the hydraulic valve 10 in a normally closed state. Normally, flow can move from the axial port 30 to the side port 34 when sufficient pressure is provided at the axial port 30 to overcome the bias of spring 46. The main-poppet 22 is shown closed such that fluid communication is blocked between the axial port 30 and the side port 34. Pressure through pilot line 90 can push on a lower end of the main-poppet 22 such that the main-poppet 22 can be lifted to open fluid communication between the axial port 30 and the side port 34 when the pressure at the axial port 30 exceeds the pressure at the side port 34. This configuration is indicated by double arrow line 92 being aligned to connect the axial port 30 to the side port 34.

Flow from the side port 34 through the chamber pressurization orifice 50 of the main-poppet 22 may charge or pressurize the main-poppet chamber 48 on a top side of the main-poppet 22 to hold the main-poppet 22 closed. That is, fluid communication between the side port 34 and the axial port 30 is blocked. Pressure through pilot line 94 wants to push the main-poppet 22 open, but the pressure on top of the main-poppet 22 combined with the spring force of the main-poppet spring 46 is greater than the pressure on the bottom such that it resists opening of the main-poppet 22 and can hold the main-poppet 22 shut.

When it is desired to open fluid communication from the side port 34 to the axial port 30, the pressure at the main-poppet chamber 48 may be relieved by actuating or energizing the solenoid coil 26 to move the pilot-poppet 20 to an open position where double arrow line 96 is aligned to allow fluid communication inside the main-poppet 22.

This will depressurize the main-poppet chamber 48 via flow moving through the one-way check valve 60 to the axial port 30 to depressurize the main-poppet chamber 48. When the main-poppet chamber 48 is depressurized, the force pressure from the bottom pilot line 94 is greater than the force pressure acting on the top side of the main-poppet 22. Thus, the pilot line 94 can push the main-poppet 22 to the open position such that flow can go across the main-poppet 22. That is, the construction provides pressure relief above the main-poppet 22 and allows the main-poppet 22 to move by pilot pressure to the open position.

Figure 3:
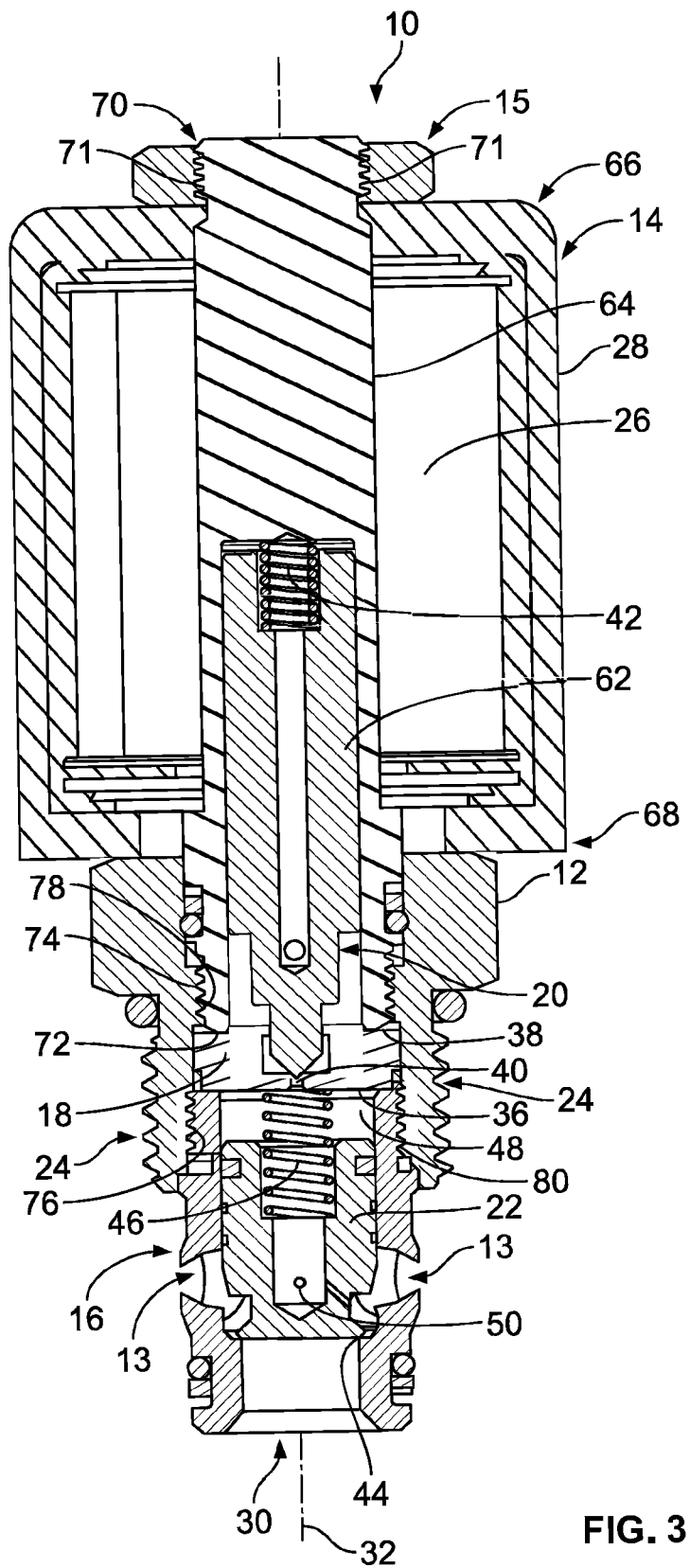
FIG. 3 is another cross-sectional view of the hydraulic valve of FIG. 1 in the closed state.
Figure 5:
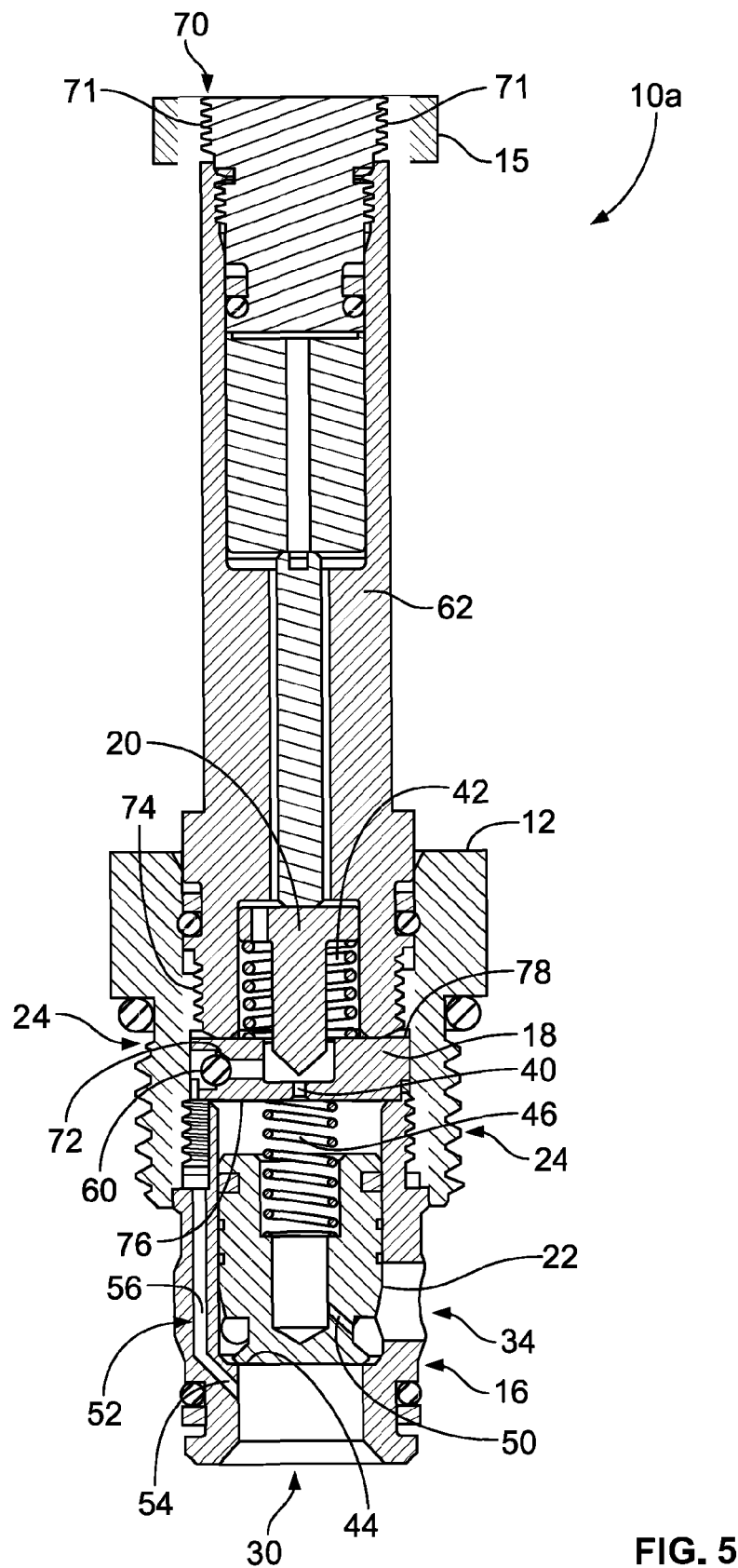
FIG. 5 is a cross-sectional view of another example hydraulic valve in accordance with the principles of the present disclosure in an open state.
Figure 6:
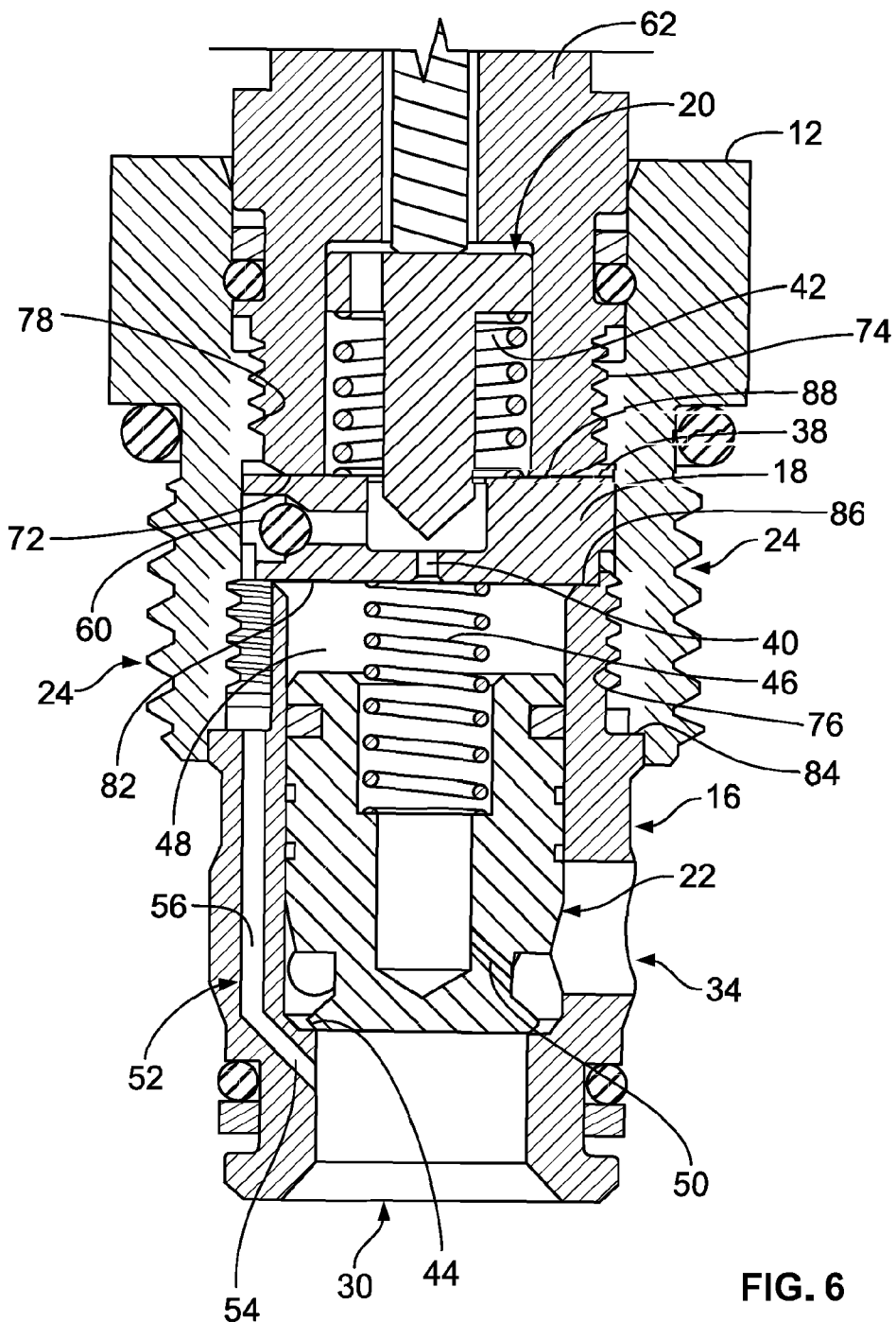
FIG. 6 is an enlarged portion of the hydraulic valve of FIG. 5.
Figure 7:
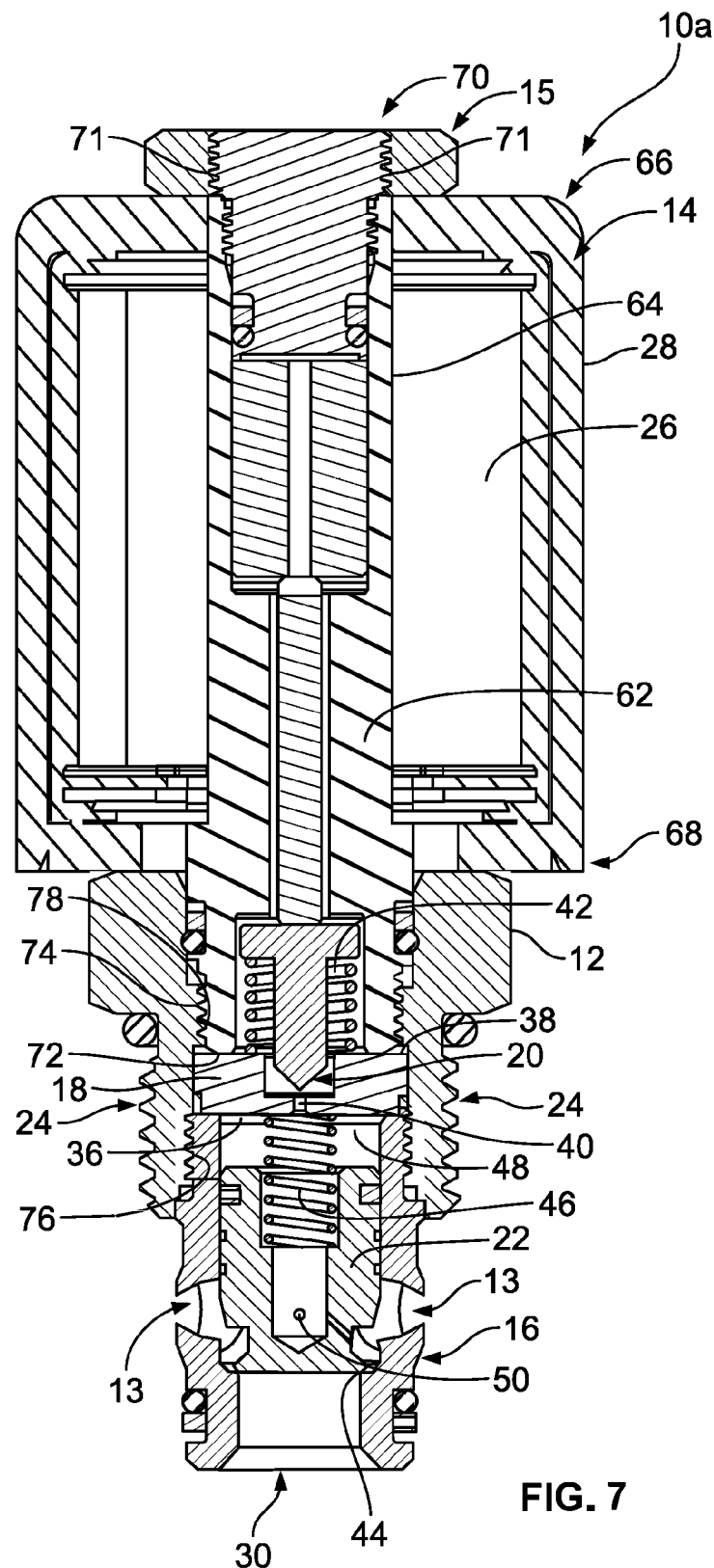
FIG. 7 is the cross-sectional view of FIG. 5 with the hydraulic valve in the open state.

Turning to FIGS. 5-7, cross-sectional views of another example configuration of a hydraulic valve 10a in accordance with the principles of the present disclosure is depicted in a normally open state. For the sake of brevity, only those portions of this hydraulic valve 10a that differ from the hydraulic valve 10 illustrated in FIGS. 1-3 discussed above will be described in detail. Thus, similar components of the hydraulic valve 10a that correspond to the respective components of the hydraulic valve 10 will not be explained in detail again.

In the hydraulic valve 10a shown, the pilot-poppet spring 42 is arranged and configured to bias the pilot-poppet 20 to the open position. That is, the pilot-poppet 20 shown lifted off the pilot port 40. When there is higher pressure in the axial port 30 as compared to the side port 34, the main-poppet 22 will lift to allow flow from the axial port 30 to the side port 34. Also, when there is higher pressure at the side port 34 as compared to the axial port 30, flow will pass through the main-poppet 22 to the axial port 30 because the pilot-poppet 20 is in the open position which prevents any pressurization within the main-poppet chamber 48. Thus, pilot pressure acting on the main poppet 22 from the side port 34 will lift the main poppet 22 from the main valve seat 44. As such, the hydraulic valve 10a allows for flow in both directions. That is, the hydraulic valve 10a normally allows flow from the axial port 30 to the side port 34 and also from the side port 34 to the axial port 30 without energizing the solenoid.

When the solenoid coil 26 of the hydraulic valve 10a is actuated or energized, the pilot-poppet 20 may be moved to the closed position in which the pilot-poppet 20 may be positioned on the pilot port 40 and fluid communication from the side port 34 to the axial port 30 may be blocked. That is, the inside of the main-poppet 22 may pressurize to hold the main-poppet 22 shut such that fluid communication from the side port 34 to the axial port 30 may be blocked. Thus, when the solenoid is energized, fluid flow is prevented from the side port 34 to the axial port 30 through the main valve seat 44.

Figure 8:
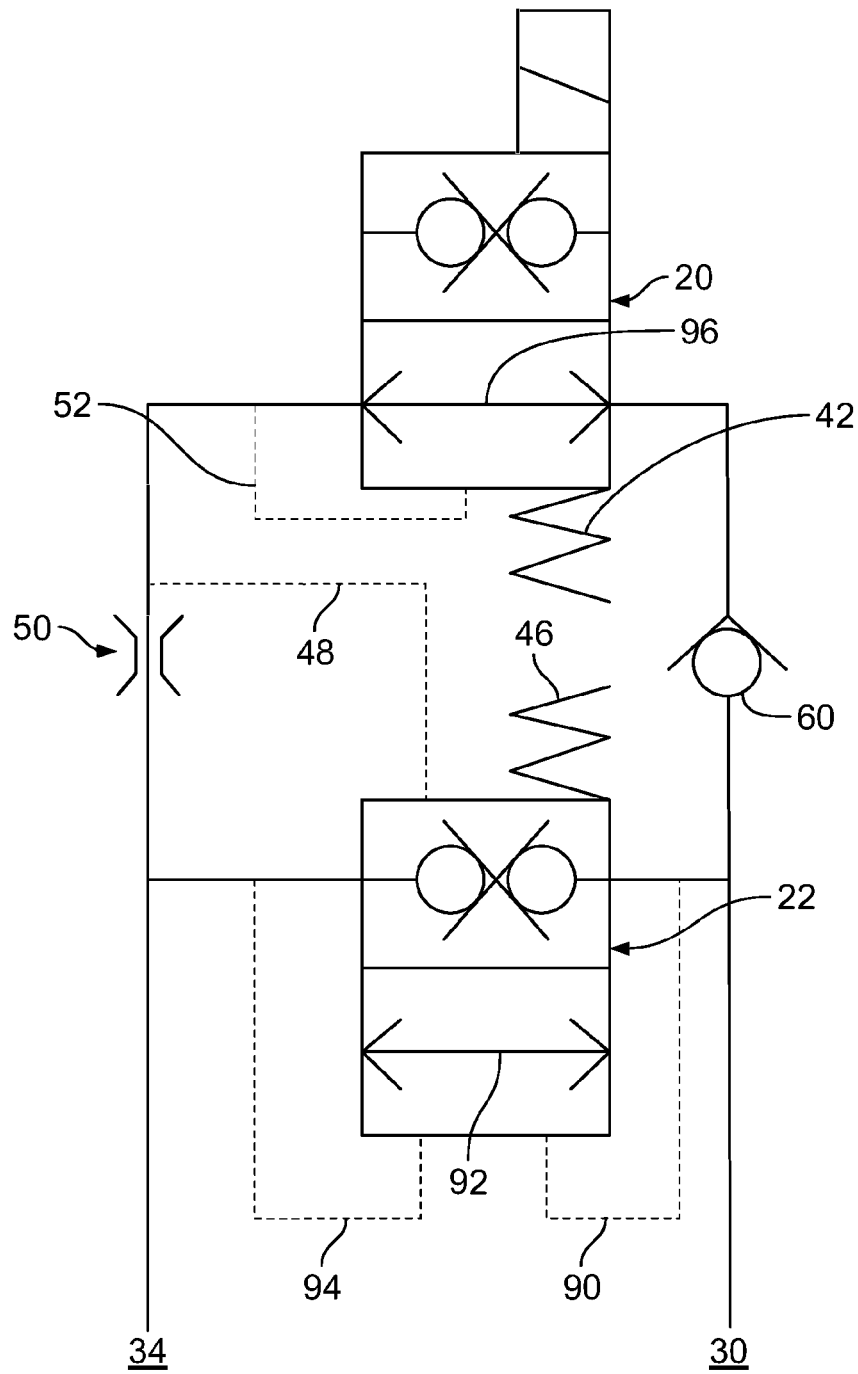
FIG. 8 is a schematic symbol illustration of the hydraulic valve of FIG. 5.

Turning to FIG. 8, a schematic symbol illustration of the hydraulic valve 10a in a normally open state is depicted. This example is different from the hydraulic valve 10 of FIG. 4 in that the pilot poppet 20 is normally in an open position.

Flow can move from the axial port 30 to the side port 34 whenever the pressure at the axial port 30 exceeds the spring force of spring 46. As depicted, the main-poppet 22 is closed such that fluid communication is blocked between the axial port 30 and the side port 34. Pressure through pilot line 90 can push on a lower end of the main-poppet 22 such that the main-poppet 22 can be lifted to open fluid communication between the axial port 30 and the side port 34. This configuration is indicated by double arrow line 92 being aligned to connect the axial port 30 to the side port 34.

When it is desired to block fluid communication from the side port 34 to the axial port 30, the solenoid coil 26 may be actuated or energized to move the pilot-poppet 20 to the closed position where the double arrow line 96 is not aligned to allow fluid communication inside the main-poppet 22. This allows the main-poppet chamber 48 to be pressurized via pressure from the side port 34 to hold the main-poppet 22 shut.

In certain examples, the one-way check valve 60 may be eliminated from the hydraulic valves 10, 10a. When the one-way check valve 60 is eliminated from the hydraulic valve 10 and the pilot-poppet 20 is also in the open position, pressure from the axial port 30 pressurizes the main-poppet chamber 48 to push the main-poppet 22 closed.

Thus, the main-poppet 22 can remain closed such that there is no fluid communication from the axial port 30 to the side port 34.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A hydraulic valve comprising:
   an outer valve housing piece including an exterior threaded portion for securing the hydraulic valve within a valve manifold;

a solenoid assembly including a solenoid coil contained within a solenoid housing, the outer valve housing piece being mounted adjacent to the solenoid assembly;

a valve cage coupled to the outer valve housing piece, the valve cage including an axial port positioned along an axis that extends through the solenoid coil, the valve cage also defining a side port;

a pilot-poppet valve seat positioned within the outer valve housing piece, the pilot-poppet valve seat and the valve cage being mechanically secured relative to each other such that relative movement between the pilot-poppet valve seat and the valve cage along the axis is prevented, the pilot-poppet valve seat defining a pilot port, and the pilot- poppet valve seat defining first and second opposite sides;

a pilot-poppet positioned at the second side of the pilot-poppet valve seat, the pilot-poppet being movable relative to the pilot-poppet valve seat along the axis between a first position and a second position, wherein the pilot-poppet closes the pilot port when in the first position, and wherein the pilot port is open when the pilot-poppet is in the second position;

a pilot-poppet spring that biases the pilot-poppet in a first axial direction toward the first position, wherein the pilot-poppet is driven in a second axial direction toward the second position when the solenoid coil is energized;

a main-poppet positioned at the first side of the pilot-poppet valve seat, the main-poppet being mechanically isolated from the pilot-poppet by the pilot-poppet valve seat, the main-poppet being positioned within the valve cage and being movable along the axis between a closed position and an open position, wherein when the main-poppet is in the closed position, the main-poppet engages a main valve seat defined by the valve cage to prevent direct fluid communication between the axial port and the side port, and wherein when the main-poppet is in the open position, the main-poppet is displaced from the main valve seat to allow direct fluid communication between the axial port and the side port;

a main-poppet spring captured between the pilot-poppet valve seat and the main-poppet for biasing the main-poppet toward the closed position; and a main-poppet chamber defined between the main-poppet and the pilot-poppet valve seat, the main-poppet including a chamber pressurization orifice that provides fluid communication between the side port and the main-poppet chamber;

wherein when the pilot-poppet is in the first position and the pressure is higher at the side port than the axial port, the main-poppet chamber is pressurized from the side port through the chamber pressurization orifice such that spring force from the main- poppet spring combined with pressure within the main-poppet chamber cooperate to hold the main-poppet in the closed position; and wherein when the pilot-poppet is in the second position and the pressure is higher at the side port than the axial port, the pilot port provides fluid communication between the main-poppet chamber and a passage that extends to the axial port such that pressure within the main-poppet chamber is relieved through the passage, thereby allowing pressure from the side port acting on an exterior of the main-poppet to move the main-poppet from the closed position to the open position against the bias of the main-poppet spring, and wherein the passage includes at least a portion drilled through the valve cage, wherein the portion includes a first section and a second section, the first section extending at an oblique angle relative to the axis from the axial port to the second section, and the second section extending parallel to the axis from adjacent the pilot-poppet valve seat to the first section.

2. The hydraulic valve of claim 1, wherein the pilot-poppet provides a pressure relief function when the pressure at the side port exceeds a predetermined level.

3. The hydraulic valve of claim 2, wherein the predetermined level is dependent upon a spring force applied to the pilot-poppet by the pilot-poppet spring and an area of the pilot-poppet exposed through the pilot port to pressure within the main-poppet chamber.

4. The hydraulic valve of claim 3, wherein when the main-poppet is in the closed position and the pressure in the main-poppet chamber is pressurized to the predetermined level by pressure from the side port, the pressure within the main-poppet chamber forces the pilot-poppet in the second direction to open the pilot port and relieve pressure from the main-poppet chamber through the passage to the axial port, and wherein when the pressure in the main-poppet chamber is relieved, the pressure from the side port acting on the exterior of the main-poppet moves the main-poppet from the closed position to the open position against the bias of the main-poppet spring such that pressure at the side port is relieved to the axial port.

5. The hydraulic valve of claim 1, wherein the passage includes a one-way check valve that allows fluid flow in a first direction from the pilot port toward the axial port and prevent fluid flow in a second direction from the axial port toward the pilot port, and wherein when the pressure at the axial port is higher than the pressure at the side port and is sufficiently high to overcome the main-poppet spring, the main-poppet is forced by the pressure acting on the main-poppet from the closed position to the open position.

6. The hydraulic valve of claim 1, wherein the second section extends through exterior threads defined by the valve cage.

7. The hydraulic valve of claim 1, wherein the pilot-poppet is integrated within a magnetic core configured to be driven in the second direction along the axis when the solenoid coil is energized by electrical current flowing through the solenoid coil, wherein the hydraulic valve further includes a core tube that extends through the solenoid coil along the axis, wherein the magnetic core is configured to move along the axis within the core tube.

8. The hydraulic valve of claim 7, wherein the solenoid housing includes a first end and an opposite second end, wherein the core tube extends between the first and second ends, wherein the core tube includes a second end secured at the second end of the solenoid housing and a first end that extends beyond the first end of the solenoid housing, and wherein the second end of the core tube defines external core tube threads.

9. The hydraulic valve of claim 8, wherein the outer valve housing piece is mounted at the first end of the solenoid housing, wherein the outer valve housing piece includes first and second sets of internal threads, and wherein the second set of internal threads engages the external core tube threads to secure the outer valve housing piece adjacent the solenoid housing.

10. The hydraulic valve of claim 9, wherein the valve cage defines external cage threads that engage the first set of internal threads of the outer valve housing piece to secure the valve cage within the outer valve housing piece.

11. The hydraulic valve of claim 10, wherein the pilot-poppet valve seat is clamped between an end of the valve cage and the second end of the core tube.

12. The hydraulic valve of claim 11, wherein a first annular seal is defined by annular axial contact between the outer valve housing piece and the valve cage, wherein a second annular seal is defined by annular axial contact between the end of the valve cage and the first side of the pilot-poppet valve seat, and wherein a third annular seal is defined by annular axial contact between the second side of the pilot-poppet valve seat and the second end of the core tube.

13. A hydraulic valve comprising:
an outer valve housing piece including an exterior threaded portion for securing the hydraulic valve within a valve manifold;
a solenoid assembly including a solenoid coil contained within a solenoid housing;
a valve cage coupled to the outer valve housing piece, the valve cage including an axial port positioned along an axis that extends through the solenoid coil, the valve cage also defining a side port;
a pilot-poppet valve seat positioned within the outer valve housing piece, the pilot-poppet valve seat and the valve cage being mechanically secured relative to each other such that relative movement between the pilot-poppet valve seat and the valve cage along the axis is prevented, the pilot-poppet valve seat defining a pilot port, and the pilot- poppet valve seat defining first and second opposite sides;
a pilot-poppet positioned at the second side of the pilot-poppet valve seat, the pilot-poppet being movable relative to the pilot-poppet valve seat along the axis between a first position and a second position, wherein the pilot port is open when the pilot-poppet is in the first position, and wherein the pilot-poppet closes the pilot port when in the second position;
a pilot-poppet spring that biases the pilot-poppet in a first axial direction toward the first position, and wherein the pilot-poppet is driven in a second axial direction toward the second position when the solenoid coil is energized;
a main-poppet positioned at the first side of the pilot-poppet valve seat, the main- poppet being mechanically isolated from the pilot-poppet by the pilot-poppet valve seat, the main-poppet being positioned within the valve cage and being movable along the axis between a closed position and an open position, wherein when the main-poppet is in the closed position, the main-poppet engages a main valve seat defined by the valve cage to prevent direct fluid communication between the axial port and the side port, and wherein when the main-poppet is in the open position, the main-poppet is displaced from the main valve seat to allow direct fluid communication between the axial port and the side port;
a main-poppet spring captured between the pilot-poppet valve seat and the main- poppet for biasing the main-poppet toward the closed position; and
a main-poppet chamber defined between the main-poppet and the pilot-poppet valve seat, the main-poppet including a chamber pressurization orifice that provides fluid communication between the side port and the main-poppet chamber;
wherein when the pilot-poppet is in the first position and the pressure is higher at the side port than the axial port, the pilot-poppet is in the open position such that the main poppet chamber is not pressurized and flow will pass through the main-poppet to the axial port;
wherein when the pilot-poppet is in the second position and the pressure is higher at the side port than the axial port, the pilot-poppet moves to the second position in which the main-poppet is in the closed position, and wherein the main-poppet pressurizes to hold the main-poppet in a closed position such that fluid communication from the side port to the axial port is blocked;
wherein the hydraulic valve further comprises a core tube that extends through the solenoid coil along the axis, and a passage that includes at least a portion drilled through the valve cage; and
wherein the portion includes a first section and a second section, the first section extending at an oblique angle relative to the axis from the axial port to the second section, and the second section extending parallel to the axis from adjacent the pilot-poppet valve seat to the first section.

14. The hydraulic valve of claim 13, wherein a first annular seal is defined by annular axial contact between the outer valve housing piece and the valve cage, wherein a second annular seal is defined by annular axial contact between an end of the valve cage and the first side of the pilot-poppet valve seat, and wherein a third annular seal is defined by annular axial contact between the second side of the pilot-poppet valve seat and an end of the core tube.

15. A solenoid valve including a two-stage construction providing reduced power consumption during actuation, the solenoid valve comprising:
(a) a solenoid coil positioned within an outer housing;
(b) a pilot-poppet valve positioned within a pilot housing, the solenoid coil being wound about a portion of the pilot housing to provide a magnetic field for actuating the pilot-poppet valve responsive to an electrical current passing through the solenoid coil, the pilot-poppet valve being movable along an axis for actuating the solenoid valve;
(c) a main-poppet valve including a main chamber, the main chamber defining first and second ports, the main chamber also defining a passage and a main chamber orifice;
(d) a pilot valve seat being positioned between the pilot housing and the main chamber, the pilot valve seat being adapted to isolate the main-poppet valve from the pilot-poppet valve such that the main-poppet valve is movable along the axis independent from the pilot-poppet valve;
(e) a retainer threadedly connected to the pilot housing and the main chamber to provide a first annular seal between the main chamber and the retainer, a second annular seal between the main chamber and the pilot valve seat, and a third annular seal between the pilot valve seat and the pilot housing; and
(f) wherein the passage includes a one-way check valve that allows fluid flow in a first direction from the second port toward the first port and prevent fluid flow in a second direction from the first port toward the second port; and wherein the passage includes a first section and a second section, the first section extending at an oblique angle relative to the axis from the first port to the second section, and the second section extending parallel to the axis from adjacent the pilot valve seat to the first section.

* * * * *